United States Patent
Shankar et al.

(10) Patent No.: US 12,204,407 B2
(45) Date of Patent: Jan. 21, 2025

(54) MULTILEVEL MEMORY SYSTEM WITH COPIED ERROR DETECTION BITS

(71) Applicant: Texas Instruments Incorporated, Dallas, TX (US)

(72) Inventors: Ruchi Shankar, Bengaluru (IN); Tejas Dhanajirao Salunkhe, Bengaluru (IN); Trevor Charles Jones, Mainburg-Meilenhofen (DE)

(73) Assignee: Texas Instruments Incorporated, Dallas, TX (US)

( * ) Notice: Subject to any disclaimer, the term of this patent is extended or adjusted under 35 U.S.C. 154(b) by 234 days.

(21) Appl. No.: 17/557,747

(22) Filed: Dec. 21, 2021

(65) Prior Publication Data

US 2023/0195565 A1 Jun. 22, 2023

(51) Int. Cl.
*G06F 11/10* (2006.01)
*G06F 11/00* (2006.01)
*G06F 11/07* (2006.01)
*G06F 12/08* (2016.01)
*G06F 12/0811* (2016.01)

(52) U.S. Cl.
CPC ...... *G06F 11/1064* (2013.01); *G06F 11/0772* (2013.01); *G06F 11/1048* (2013.01); *G06F 12/0811* (2013.01)

(58) Field of Classification Search
CPC ............. G06F 11/0772; G06F 11/1048; G06F 12/0895; G06F 12/0864; G06F 11/1012; G06F 12/0811; G06F 11/1064; G06F 11/1072; G06F 2212/1016; G06F 2212/1032; G06F 2212/403
See application file for complete search history.

(56) References Cited

U.S. PATENT DOCUMENTS

| | | | | |
|---|---|---|---|---|
| 7,987,384 | B2 * | 7/2011 | Jacobi ................ | G06F 12/0804 714/6.24 |
| 8,874,958 | B2 * | 10/2014 | Gilbert ............... | G06F 11/2082 714/6.22 |
| 2007/0044003 | A1 * | 2/2007 | Doweck ............... | G11C 29/52 714/763 |
| 2009/0204766 | A1 * | 8/2009 | Jacobi ................ | G06F 11/1064 711/133 |

OTHER PUBLICATIONS

"Hamming code", Wikipedia, available at https://en.wikipedia.org/w/index.php?title=Hamming_code&oldid=1049521840 on Oct. 21, 2021, pp. 1-7.
"ECC memory", Wikipedia, available at https://en.wikipedia.org/w/index.php?title=ECC_memory&oldid=1035315325 on Jul. 24, 2021, pp. 1-8.

* cited by examiner

*Primary Examiner* — Justin R Knapp
(74) *Attorney, Agent, or Firm* — Xianghui Huang; Frank D. Cimino

(57) ABSTRACT

In described examples, a memory system is accessed by reading a data line and error detection bits for the data line from a first memory. The data line and the error detection bits from the first memory are decoded to determine if an error is present in the data line from the first memory. A copy of the data line and the error detection bits are stored in a second memory. The copy of the data line and error detection bits are read from the second memory. The copy of the data line and error detection bits are decoded to determine if an error is present in the copy of the data line from the second memory.

15 Claims, 6 Drawing Sheets

MULTILEVEL MEMORY SYSTEM WITH COPIED ERROR DETECTION BITS

TECHNICAL FIELD

This relates to a multilevel memory system in which error detection parity bits are copied from one level of memory to another level of memory.

BACKGROUND

Error correction codes (ECC) protect against undetected memory data corruption. ECC memory is typically used in computers where such corruption is unacceptable, such as: automotive and industrial control systems, some scientific and financial computing applications, and in database and file servers. ECC also reduces the number of crashes that are especially unacceptable in multiuser server applications and maximum-availability systems. Electrical or magnetic interference inside a computer system can cause a single bit of dynamic random-access memory (DRAM) to spontaneously flip to the opposite state. It was initially thought that this was mainly due to alpha particles emitted by contaminants in chip packaging material, but research has shown that the majority of one-off soft errors in DRAM chips occur as a result of background radiation, chiefly neutrons from cosmic ray secondaries, which may change the contents of one or more memory cells or interfere with the circuitry used to read or write to them.

The most-common error-correction codes use Hamming or Hsiao codes that provide single-bit error correction and double-bit error detection (SEC-DED). Other error-correction codes have been proposed for protecting memory, such as double-bit error correcting and triple-bit error detecting (DEC-TED) codes, single-nibble error correcting and double-nibble error detecting (SNC-DND) codes, Reed-Solomon error correction codes, etc. However, in practice, multi-bit correction is usually implemented by interleaving multiple SEC-DED codes.

Robust fault detection can be provided by having two or more processors operate in lock step with monitoring logic to detect and flag any difference in results. However, this approach requires a significant overhead in size and cost.

Another approach for fault detection and mitigation is to periodically interrupt the operation of a processor in a system to allow a safety diagnostic routine to be executed that injects faults into various hardware locations and then checks to verify that the injected faults are detected. In some systems such interrupts may be triggered as often as every two-three seconds and therefore have an impact on system performance.

SUMMARY

In described examples, a memory system is accessed by reading a data line and error detection bits for the data line from a first memory. The data line and the error detection bits from the first memory are decoded to determine if an error is present in the data line from the first memory. A copy of the data line and the error detection bits are stored in a second memory. The copy of the data line and error detection bits are read from the second memory. The copy of the data line and error detection bits are decoded to determine if an error is present in the copy of the data line from the second memory.

DETAILED DESCRIPTION

Figure 1:
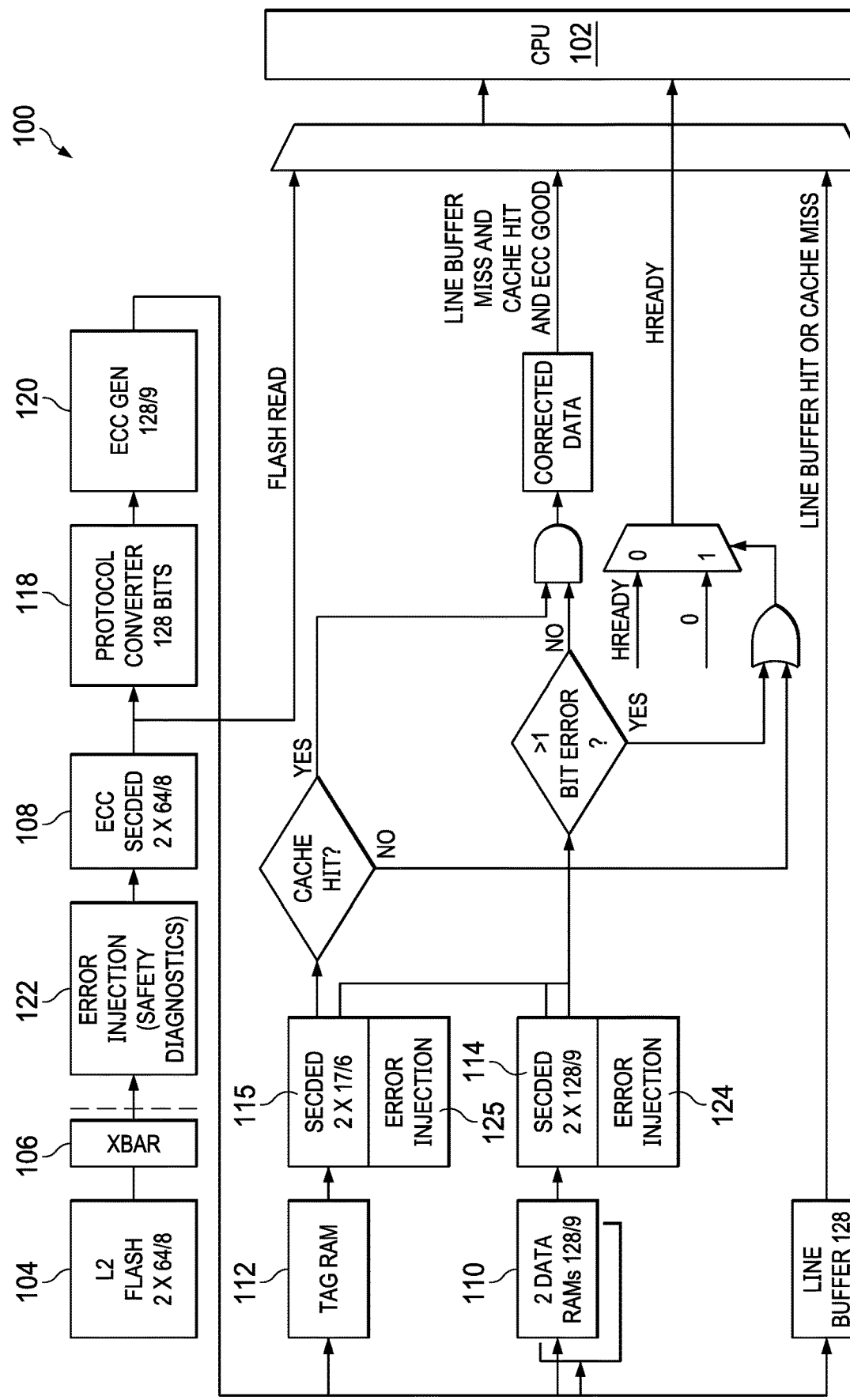
FIG. 1 is a block diagram of a prior system with a multilevel memory hierarchy.

In the drawings, like elements are denoted by like reference numerals for consistency.

Typically, ECC memory maintains a memory system immune to single-bit errors: the data that is read from each word is always the same as the data that had been written to it, even if one of the bits actually stored has been flipped to the wrong state. Most non-ECC memory cannot detect errors, although some non-ECC memory with parity support allows detection but not correction. The general concept of ECC memory is well known; see, for example, "ECC Memory," Wikipedia, last edited Jul. 24, 2021, or later.

In computer science and telecommunication, Hamming codes are a family of linear error-correcting codes. Hamming codes can detect one-bit and two-bit errors and correct one-bit errors. In contrast, a simple parity code cannot correct errors and can detect only an odd number of bits in error. Due to the limited redundancy that Hamming codes add to the data, they can only detect and correct errors when the error rate is low. This is the case in computer memory, such as random-access memory (RAM), where bit errors are extremely rare and Hamming codes are widely used. A RAM with this correction system is referred to as "ECC RAM," or "ECC memory." In this context, an extended Hamming code having one extra parity bit is often used. Extended Hamming codes achieve a Hamming distance of four, which allows the decoder to distinguish between when at most one one-bit error occurs and when any two-bit errors occur. In this sense, extended Hamming codes are single-error correcting and double-error detecting, abbreviated as SECDED. ECC logic generates a "syndrome" using the accessed data line and the accompanying ECC bits. In described examples, a syndrome of "0" indicates no errors in the accessed data line. The value of a non-zero syndrome indicates which bit in the accessed line of data is in error. The theory of Hamming codes is described in the literature; see, for example: "Hamming Code," Wikipedia, last edited Oct. 12, 2021, or later.

An example system includes at least one processor, also referred to as a "microprocessor," or a "central processing unit" (CPU), "microcontroller," etc. and one or more levels of memory. In some examples, multiple processors and/or memory modules are interconnected by a simple interconnect bus. In other examples, a more complicated interconnect, such as a crossbar structure, is provided to allow faster access between various system modules. For physically different kinds of memory there may be significant differences in the time to read or write the contents of a particular location in memory, the amount of information that is read or written on a given occasion, the total volume of information that can be stored, and the unit costs of storing a given amount of information. To optimize its use and to achieve greater efficiency and economy, memory is organized in a hierarchy with the highest performance and in general the most expensive devices at the top, and with progressively lower performance and less costly devices in succeeding layers.

The contents of a typical memory hierarchy, and the way in which data moves between adjacent layers, can be organized as follows. A single word is held in each register of the processor. In an example processor a word stored in a register contains four bytes. Cache is referred to as level one (L1) in a memory hierarchy because registers are typically not included in the memory hierarchy. Groups of words are stored within the cache; typically a single group in the cache will hold 64 words (for example—256 bytes). A typical cache may have, for example, 1024 such groups, giving a total cache capacity of 256 Kbytes. Single words pass between the cache and registers within the processor. All transfers into and out of the cache are controlled entirely by hardware. Main memory is referred to as level two (L2) in this example memory hierarchy. On a very high-performance system, groups of words corresponding to a group within the cache are transferred between the cache and the main memory in a single cycle of main memory. On lower-performance systems the size of the group of words in the cache is larger than the width of the memory bus, and the transfer takes the form of a sequence of memory cycles. The algorithm that controls this movement is implemented entirely in hardware. Main memory sizes vary, from as little as 1 Mbyte on a small system up to several Gbytes on a high-performance system.

Some example systems may include additional memory layers. For example, there may be two or three layers of caches that may include separate data and instruction caches. A first layer (L1) cache is typically relatively smaller and highest performance, while subsequent layer caches (L2, L3, etc.) are larger but slower. Slower non-volatile memory, such as flash memory or other read only memory (ROM), may form a higher level of the memory hierarchy. Flash memory is a type of erasable read-only memory (EEPROM) that clears and rewrites data in chunks for fast, energy-efficient access and rewriting. Flash memory, or flash storage, is non-volatile, which means it remains viable even without an active power source. Although technically a type of read-only memory, flash memory is distinct from conventional ROM in that it can be written to as well as read from.

Typically, the ECC parity bits are decoded, evaluated, and re-encoded with different schemes to match the configuration of each level of memory in the memory hierarchy, such as cache, crossbar interconnect, bulk memory, etc. This adds delay time each time new parity bits are encoded for a different level in the memory system. In described examples, the same ECC parity bits are copied from one memory level to another in order to eliminate encoding delay.

To assure correct memory system operation, a system may use a software-initiated safety diagnostic process that performs tests of the memory system in a periodic manner, such as once every 2-3 seconds, to satisfy a target fault tolerant time interval (FTTI) requirement. In this case, the software diagnostic injects a memory word fault to generate latent fault coverage and stalls the CPU execution in order to verify that an actual fault will be detected. A software-initiated safety diagnostic process produces software overhead that may have an impact on system performance. Moreover, a software-initiated safety diagnostic test is only active for a short time when triggered and then does not function until the next trigger time. In the interval between the tests, the processor could be executing bad instructions which goes undetected.

FIG. 1 is a block diagram of a typical system 100 with a multilevel memory hierarchy. System 100 includes processor 102 that executes instructions that are stored in level 2 flash memory 104. A crossbar interconnect 106 provides accessed memory words to ECC logic 108. ECC logic 108 corrects single bit errors and detects double bit errors. Correct instruction data is then provided to processor 102. If an uncorrectable error is detected, an error protocol is invoked.

System 100 includes a level 1 two-way cache 110 that includes a tag RAM 112. When a requested instruction word is present in cache 110 as indicated by tag RAM 112, the requested word is provided to ECC logic 114. ECC logic 114 corrects single bit errors and detects double bit errors. Correct instruction data is then provided from cache 110 to processor 102. If an uncorrectable error is detected, an error protocol is invoked.

Select instruction words are stored in line buffer 116, which is essentially a register that is unlikely to sustain bit errors. Therefore, no error correction logic is associated with line buffer 116.

As mentioned earlier, a software-initiated safety diagnostic process that performs tests of the memory system in a periodic manner, such as once every 2-3 seconds, to satisfy a target fault tolerant time interval (FTTI) requirement can be used. In this case, the software diagnostic causes fault injection logic 122 to inject a memory word fault to generate fault by flash ECC logic 108 and stalls the CPU execution in order to verify that an actual fault will be detected by ECC logic 108. The software diagnostic also causes fault injection logic 124 to inject a memory word fault to generate fault by cache ECC logic 114 and stalls the CPU execution in order to verify that an actual fault will be detected by ECC logic 114. Similarly, the software diagnostic also causes fault injection logic 125 to inject a memory word fault to generate fault by tag RAM ECC logic 115 and stalls the CPU execution in order to verify that an actual fault will be detected by ECC logic 115.

In this example, flash RAM 104 has two banks that are each 64 bits wide, to store two 32-bit words per line. Each 64-bit line is protected by an eight-bit ECC. Cache 110 has 128-bit lines that are protected by a nine-bit ECC. Therefore, when data accessed from flash 104 and stored into cache 110, it is converted from 64 bits to 128 bits per line by protocol converter 118. A new nine-bit ECC is then generated by ECC generator 120.

Figure 2:
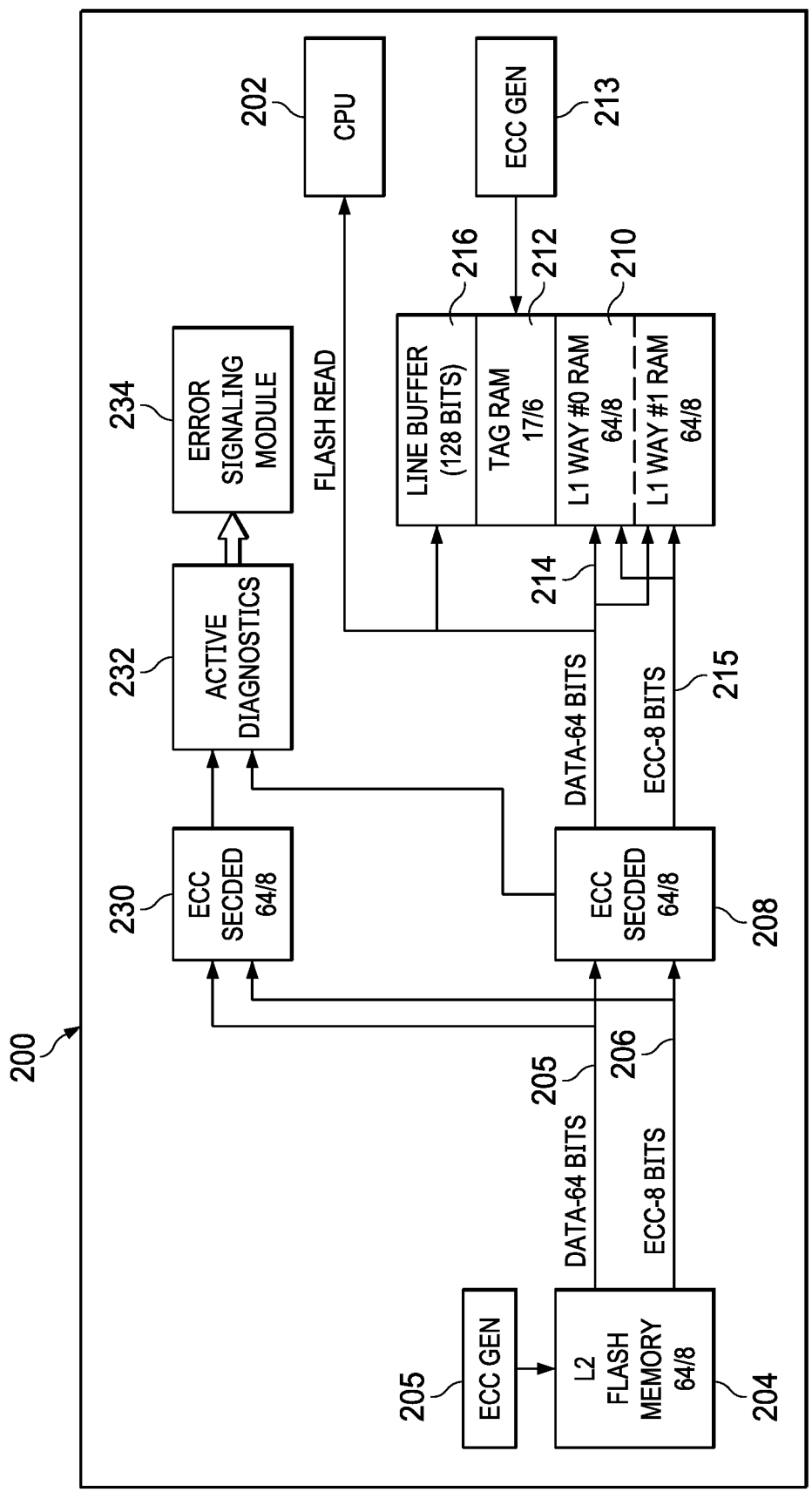
FIG. 2 is an example of a system with a multilevel memory with copied error detection bits and active continuous diagnostic logic.
Figure 3:
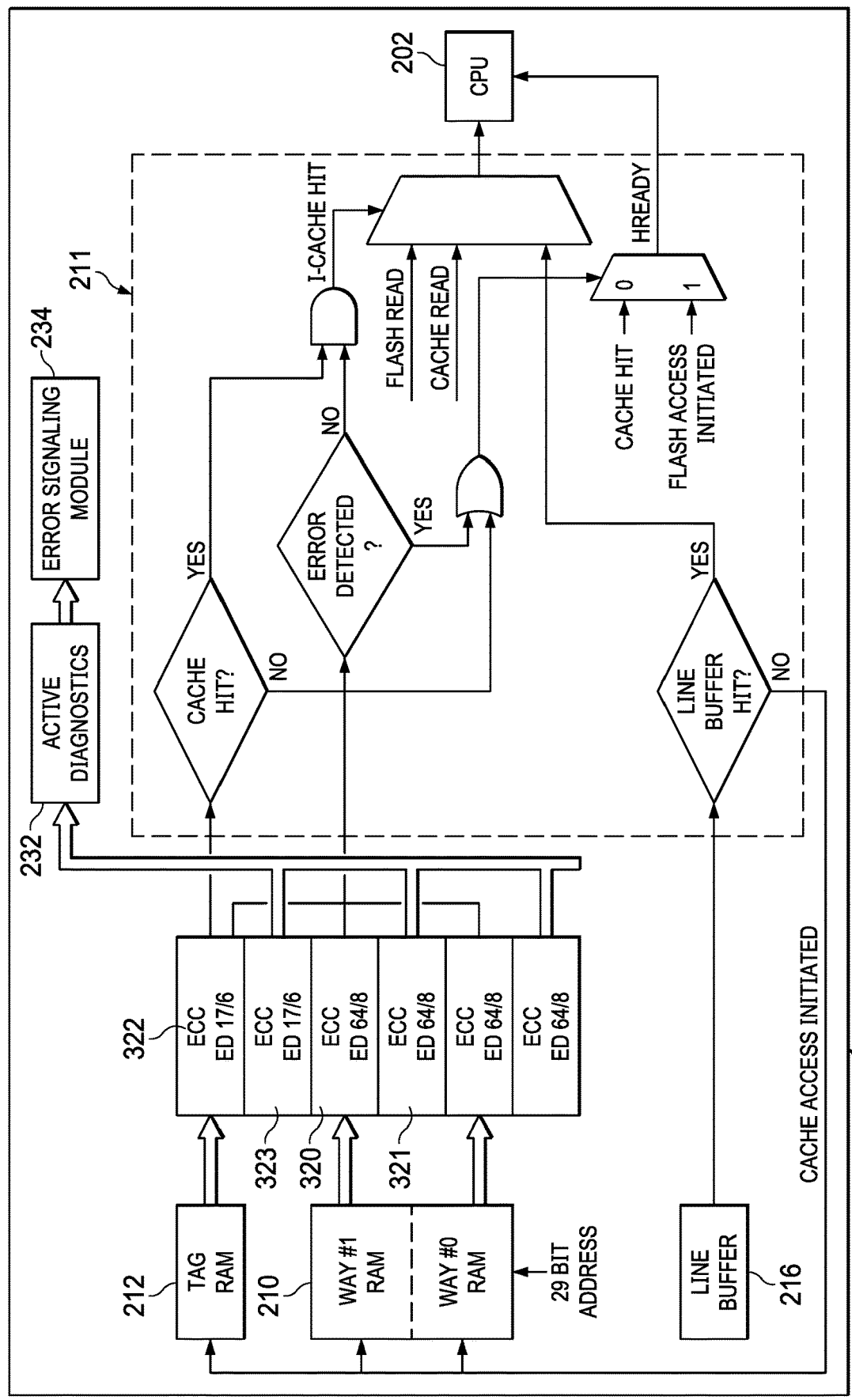
FIG. 3 is a more detailed block diagram of the example system of FIG. 2 illustrating continuous active diagnostic logic.

FIG. 2 is an example of a system 200 with a multilevel memory with copied error detection bits and active continuous diagnostic logic 232. FIG. 3 is a more detailed block diagram of the example system 200. System 200 includes processor 202 that executes instructions that are stored in level 2 flash memory 204. ECC generation logic 205 generates ECC bits for each line that is written into L2 flash memory 204, using a known or later developed ECC coding technique. In this example, an 8-bit Hamming code is generated for a 64-bit line of instruction data. In this example, a crossbar interconnect (not shown) provides accessed memory words to ECC logic 208. ECC logic 208 generates a syndrome from an accessed 64-bit line and the accompanying ECC bits to correct single bit errors and detect double bit errors. Correct instruction data is then provided to processor 202. If an uncorrectable error is detected, an error protocol is invoked.

System 200 includes an L1 two-way cache 210 that includes a tag RAM 212 and control logic 211. In this example, tag RAM 212 stores 17 bits of address data to identify what entries are present in cache 210 and includes 6 bits of ECC for each entry. When a requested instruction word is present in cache 210 as indicated by tag RAM 212, the requested word is provided to ECC logic 320 (FIG. 3), and the associated tag is presented to ECC logic 322. In this example, ECC logic 320, 322 detects single- and double-bit errors. In this example, ECC logic 320, 322 is not configured to correct single bit errors in order to reduce complexity and time delay. If an error is detected, the cache entry can be marked as not present, and a correct version of the data can be fetched from L2 flash 204. If no error is detected, the instruction data is then provided from cache 210 to processor 202.

Select instruction words are stored in line buffer 216, which is essentially a register that is unlikely to sustain bit errors. Therefore, in this example no error correction logic is associated with line buffer 216.

In this example, L2 flash 204 and L1 cache 210 are designed to have the same line width so that the same number of ECC bits can be applied to each memory level. In this example, 64-bit instruction data is accessed from L2 flash memory 204 and provided to ECC logic 208 on data bus 205, along with 8-bit ECC on ECC bus 206. In this example, ECC logic 208 uses a known Hamming code technique to detect two-bit errors and to correct single bit errors. In another example, other known or later developed error detection and correction techniques may be use. If no errors are detected, or if a single bit error is detected and corrected, the 64-bit instruction data is then forwarded to processor 202.

For instructions that are to be cached, if no errors are detected, or if a single bit error is detected and corrected, the 64-bit instruction data is then copied to cache 210 on bus 214. The same ECC provided on bus 206 is copied and provided to L1 cache 210 on ECC bus 215. In the case where a single bit error occurred in the ECC bits, then the corrected version of the ECC bits are provided on ECC bus 215. In this manner, ECC bit generation is not required for cache 210, which eliminates logic and reduces propagation delay in the critical timing path from L2 flash 204 to L1 cache 210.

ECC generation logic 213 is provided for tag RAM 212. Tag RAM 212 stores 17 bits of address data to identify what entries are present in cache 210 and includes 6 bits of ECC for each entry. The ECC for tag RAM 212 is generated based on the address of data being accessed from L2 flash 204, so the propagation time for ECC generator 213 is not in a critical path.

In this example, redundant ECC logic 230 is provided that mirrors ECC logic 208. Similar redundant ECC logic 321, 323 is illustrated in FIG. 3 for L1 cache 210 and tag RAM 212. During each access to L2 flash 204, ECC logic 208 and redundant ECC logic 230 generate syndromes in parallel to identify single- or double-bit errors. Active diagnostic logic 232 monitors ECC logic 208 and redundant ECC logic 230 and compares the syndrome output of each unit. If there is a disagreement indicating a failure of the ECC logic, then an error is posted by error logic module 234 that interrupts processor 202 before it executes an instruction that may have a defective bit that was not detected by ECC logic 208.

Similarly, during each access to L1 cache 210, ECC logic 320, 322 and redundant ECC logic 321, 323 operate in parallel to identify single- or double-bit errors. Active diagnostic logic 232 monitors ECC logic 320, 322 and redundant ECC logic 321, 323 and compares the output of each unit. If there is a disagreement indicating a failure of the ECC logic, then an error is posted by error logic module 234 that interrupts processor 202 before it executes an instruction that may have a defective bit that was not detected by ECC logic 320, 322.

In FIG. 2 and FIG. 3, two-way instruction cache 210 is illustrated. In this example, an additional data cache is not shown to simplify the figure. In some examples, the data cache is configured in a similar manner to allow copied ECC to be used.

Figure 4:
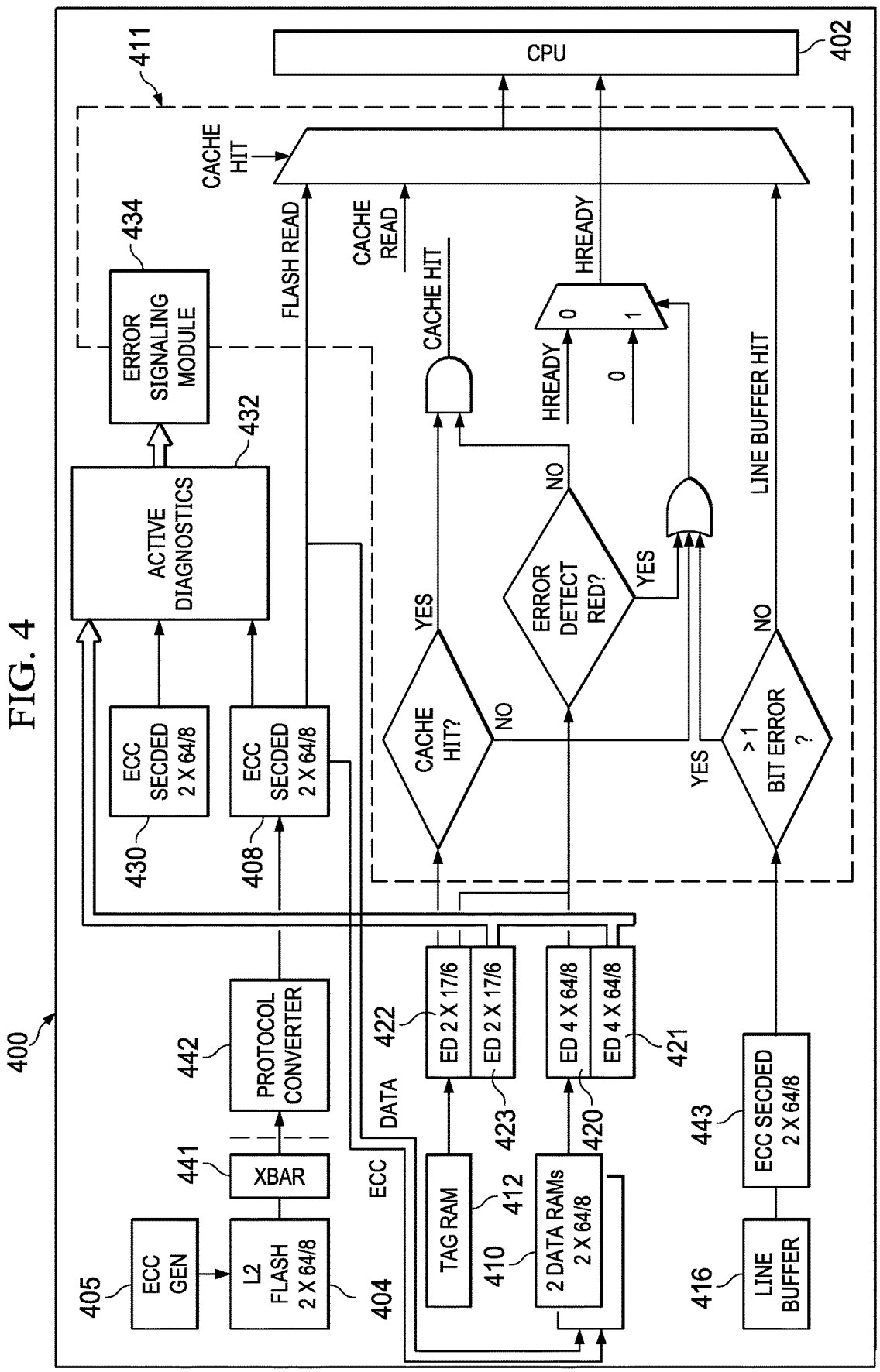
FIG. 4 is a block diagram of another example system with a multilevel memory with copied error detection bits and active continuous diagnostic logic.

FIG. 4 is a block diagram of another example system 400 with a multilevel memory with copied error detection bits and active continuous diagnostic logic. System 400 includes processor 402 that executes instructions that are stored in L2 flash memory 404 that is organized as two banks of 64-bit lines with 8 ECC bits/line. In this manner, 128-bit lines of instruction data can be fetched at once. ECC generation logic 405 generates ECC bits for each line that is written into L2 flash memory 404, using a known or later developed ECC coding technique. In this example, an 8-bit Hamming code is generated. In this example, a crossbar interconnect 441 provides accessed memory words to protocol converter 442 and then to ECC logic 408. In this example, ECC logic 408 has two portions that operate in parallel on each bank of L2 flash 404 to generate syndromes to correct single bit errors and detects double bit errors from each bank. Correct instruction data is then provided to processor 402. If an uncorrectable error is detected, an error protocol is invoked.

Protocol converter 442 acts as in interface between the memory system bus protocol used by flash memory 404 and crossbar 441 and the bus protocol for ECC logic 408. In this example, the memory system bus protocol is based on the advanced microcontroller high performance bus architecture (AHB) standard. In other examples, other types of memory system buses and respective interface logic may be used.

System 400 includes an L1 two-way cache 410 that includes a tag RAM 412 and control logic 411. In this example, each way of L1 cache 410 is also organized as two banks of 64-bit lines with 8 ECC bits/line. In this example, tag RAM 412 stores 17 bits of address data to identify what entries are present in cache 410 and includes 6 bits of ECC for each entry. When a requested instruction word is present in cache 410 as indicated by tag RAM 412, the requested word is provided to error detection (ED) logic 420 and the associated tag is presented to ECC logic 422. In this example, ED logic 420, 422 detects single- and double-bit errors. In this example, ED logic 420, 422 is not configured to correct single bit errors in order to reduce complexity and time delay. If an error is detected, the cache entry can be marked as not present, and a correct version of the data can be fetched from L2 flash 404. If no error is detected, the instruction data is then provided from cache 410 to processor 402.

Select instruction words are stored in line buffer 416. In this example, line buffer 416 is also organized as two banks of 64-bit lines with 8 ECC bits/line. When a requested instruction word is present in line buffer 416, the requested line is presented to ECC logic 443. In this example, ECC logic 443 detects single- and double-bit errors. In this example, ECC logic 443 is configured to correct single bit errors. In another example, error logic could be implemented to not correct errors in order to reduce complexity and time delay. In that case, if an error is detected, the line buffer entry can be marked as not present, and a correct version of the data can be fetched from L2 flash 404. If no error is detected, the instruction data is then provided from line buffer 416 to processor 402.

In this example, L2 flash 404, L1 cache 410, and line buffer 416 are designed to have the same line width so that the same number of ECC bits can be applied to each memory level. In this example, 128-bit instruction data is accessed as two 64-bit lines from L2 flash memory 404 and provided to ECC logic 408 on a data bus (similar to data bus 205, FIG. 2), along with 8-bit ECC for each 64-bit line on an ECC bus (similar to ECC bus 206, FIG. 2). If no errors are detected, or if a single bit error is detected and corrected, the 128-bit instruction data is then forwarded to processor 402.

For instructions that are to be cached, if no errors are detected, or if a single bit error is detected and corrected, the 128-bit instruction data is then forwarded to cache 410 from ECC logic 408 on a data bus and stored in two 64-bit banks. The same ECC bits provided on the ECC bus are copied and provided to L1 cache 410. In the case where a single bit error occurred in the ECC bits, then the corrected version of the ECC is provided to cache 410 from ECC logic 408. In this manner, ECC bit generation is not required for cache 410, which eliminates logic and reduces propagation delay in the critical timing path from L2 flash 404 to L1 cache 410.

In a similar manner, for instructions that are stored in line buffer 416, the same ECC provided on the ECC bus is copied and provided to line buffer 416. In the case where a single bit error occurred in the ECC bits, then the corrected version of the ECC is provided to line buffer 416. In this manner, ECC bit generation is not required for line buffer 416, which eliminates logic and reduces propagation delay in the critical timing path from L2 flash 404 to L1 line buffer 416.

In this example, redundant ECC logic 430 is provided that mirrors ECC logic 408. Similar redundant ECC logic 421, 423 is provided for L1 cache 410 and tag RAM 412. During each access to L2 flash 404, ECC logic 408 and redundant ECC logic 430 generate syndromes in parallel to identify single- or double-bit errors. Active diagnostic logic 432 monitors ECC logic 408 and redundant ECC logic 430 and compares the syndrome output of each unit. If there is a disagreement indicating a failure of the ECC logic, then an error is posted by error logic module 434 that interrupts processor 402 before it executes an instruction that may have a defective bit that was not detected by ECC logic 408.

Similarly, during each access to L1 cache 410, ED logic 420, 422 and redundant ECC logic 421, 423 operate in parallel to identify single- or double-bit errors. Active diagnostic logic 432 monitors ECC logic 420, 422 and redundant ED logic 421, 423 and compares the syndrome output of each unit. If there is a disagreement indicating a failure of the ECC logic, then an error is posted by error logic module 434 that interrupts processor 402 before it executes an instruction that may have a defective bit that was not detected by ED logic 420, 422. In this example, L1 cache is a two-way cache, and each way has two 64-bit banks. Therefore, there are four independent error detection portions within ED logic 420 and four independent error detection portion in redundant ED logic 421 that all operate in parallel.

In FIG. 4, two-way instruction cache 410 is illustrated. In this example, an additional data cache is not shown to simplify the figure. In some examples, the data cache is configured in a similar manner to allow copied ECC to be used.

Figure 5:
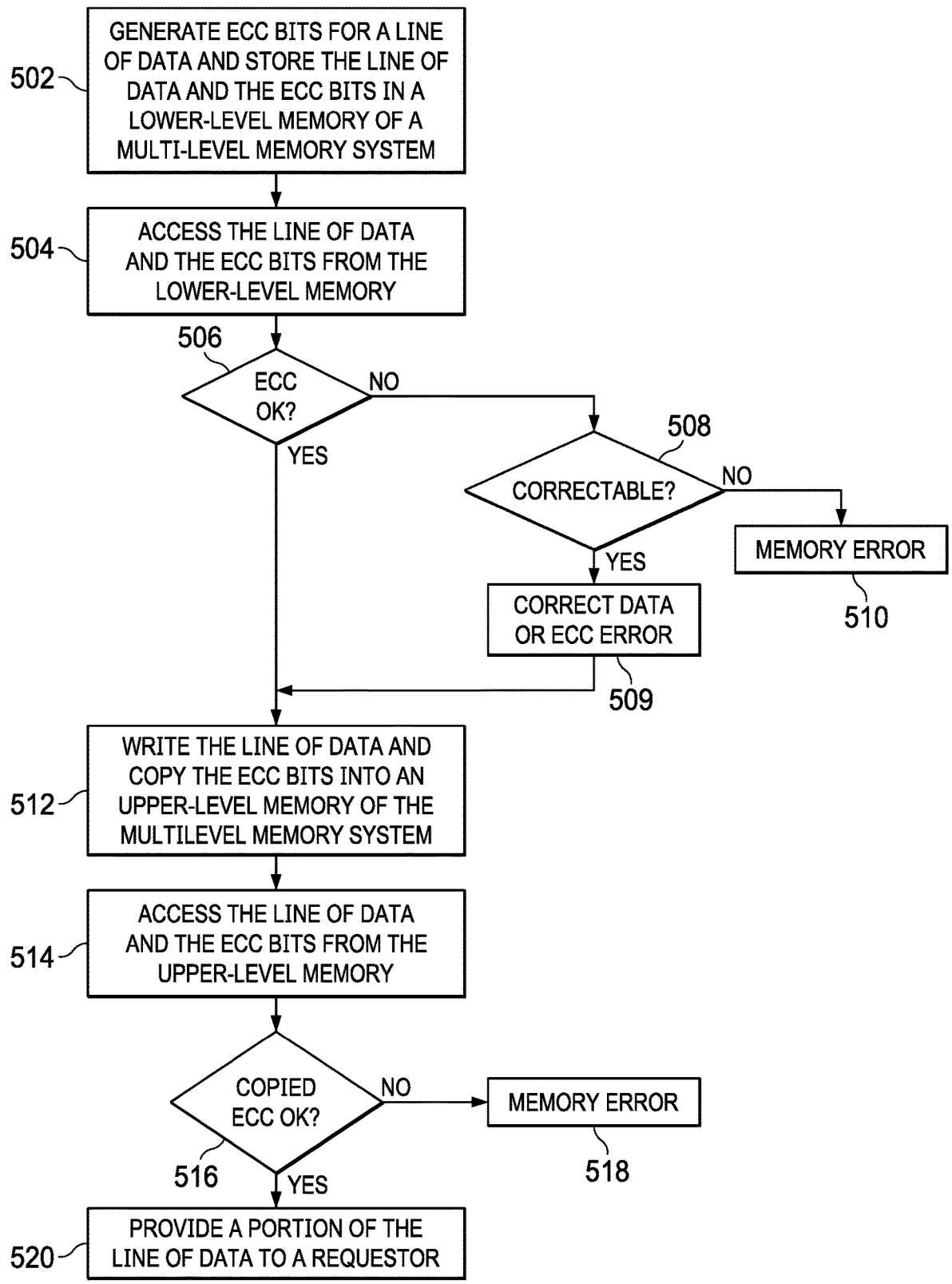
FIG. 5 is a flow diagram illustrating operation of a hierarchical memory system with copied error detection bits.

FIG. 5 is a flow diagram illustrating operation of a hierarchical memory system with copied error detection bits. In this example, a system, such as system 200 (FIG. 2) or system 400 (FIG. 4) has a requestor, such as processor 202 (FIG. 2) or processor 402 (FIG. 4) that is requesting data from a hierarchical memory system that has a lower level memory (such as L2 flash 204 (FIG. 2) or L2 flash 404 (FIG. 4)) and an upper level memory (such as L1 cache 210 (FIG. 2), L1 cache 410 (FIG. 4), or line buffer 416 (FIG. 4)).

At 502, a line of data is provided by a processor or other source of data and ECC bits are generated using a known or later developed coding scheme. In this example, a Hamming code is generated. The line of data and respective ECC bits are then written into a designated line of a lower-level memory that is part of the hierarchical memory system.

At 504, sometime later the line of data and respective ECC bits are accessed from the lower-level memory. In this example, the line of data is accessed in response to a request to the upper-level memory. For example, a processor requests a line of data from a cache. If the cache does not contain the data, then the cache control logic accesses a lower-level memory in the hierarchical memory system.

At 506, ECC error detection and correction logic coupled to the lower-level memory examines the accessed data and ECC bits. If the ECC logic determines there are no errors, then the line of data and the respective ECC bits are copied into the upper-level memory without change at 512.

At 508, if the ECC logic detected an error at 506, if the error is correctable then the defect is corrected at 509 and the corrected data and respective ECC bits are copied into the upper-level memory at 512. In this example, a double bit error can be detected with the Hamming code, but only a single bit error can be corrected. In another example, a more complex ECC code may be used in order to detect and/or correct additional bit errors.

At 510, if a detected error cannot be corrected, then a memory error protocol is invoked. In this example, instruction execution of the processor is halted so that an erroneous instruction is not executed.

At 514, the line of data and respective ECC bits in the upper-level memory are accessed. For example, the processor accesses instruction data from the instruction cache.

At 516, ECC logic coupled to the upper-level memory examines the data accessed from the upper-level memory. If the ECC logic determines there are no errors, then the line of data is provided to the requestor without change at 520.

At 518, if an error is detected, then a memory error protocol is invoked. In this example, instruction execution of the processor is halted so that an erroneous instruction is not executed. In this example, error correction is not performed by the upper level ECC logic since a correct copy of the accessed data can be obtained from the lower-level memory.

Figure 6:
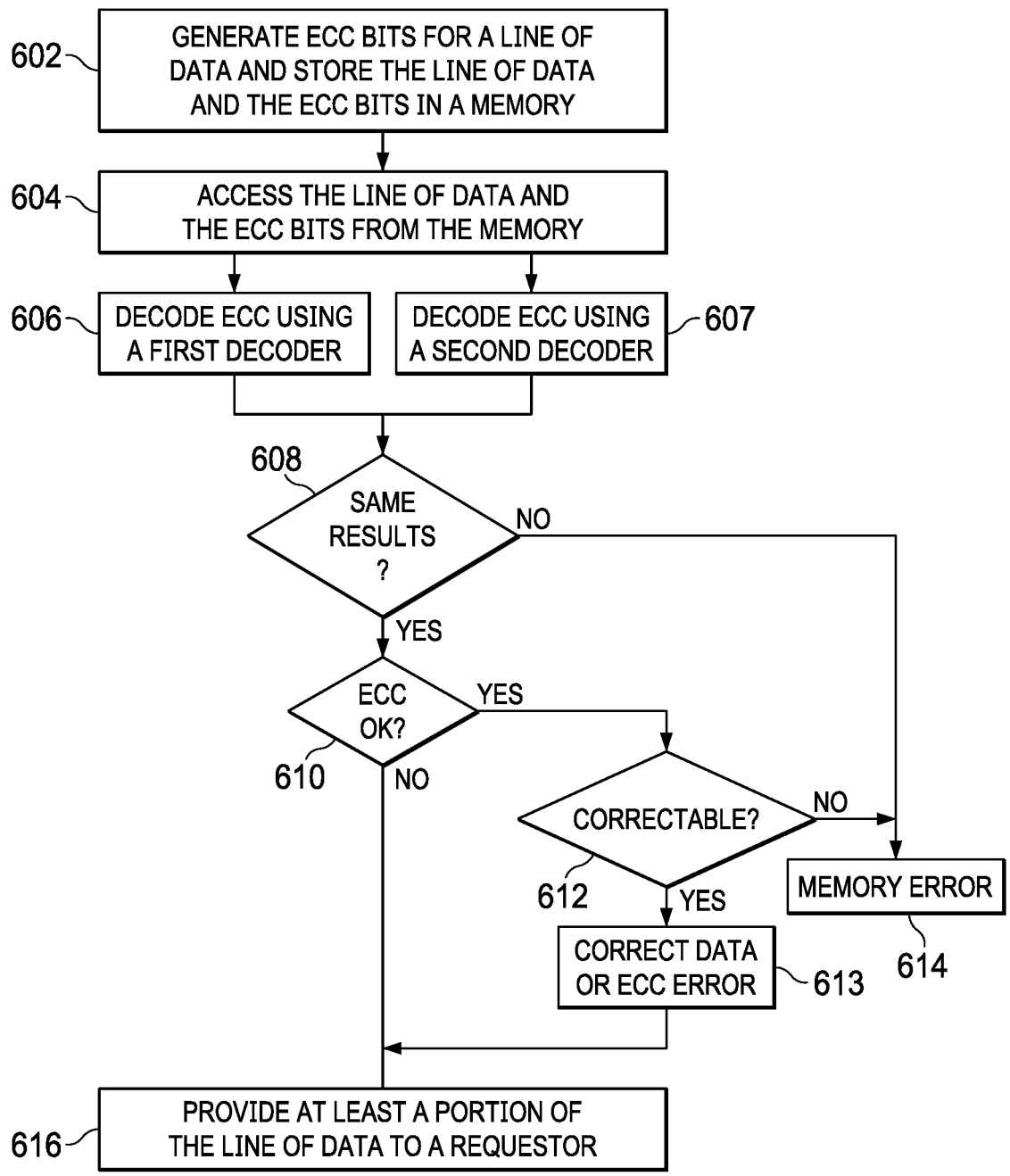
FIG. 6 is a flow diagram illustrating operation of a hierarchical memory system with continuous active diagnostic logic.

FIG. 6 is a flow diagram illustrating operation of a memory system with continuous active diagnostic logic. In this example, a system, such as system 200 (FIG. 2) or system 400 (FIG. 4) has a requestor, such as processor 202 (FIG. 2) or processor 402 (FIG. 4) that is requesting data from a hierarchical memory system that has a lower level memory (such as L2 flash 204 (FIG. 2) or L2 flash 404 (FIG. 4)) and an upper level memory (such as L1 cache 210 (FIG. 2), L1 cache 410 (FIG. 4), or line buffer 416 (FIG. 4)). In another example, there may be just a single level memory that includes continuous active diagnostic logic.

At 602, a line of data is provided by a processor or other source of data and ECC bits are generated using a known or later developed coding scheme. In this example, a Hamming code is generated. The line of data and respective ECC bits are then written into a designated line of a memory. This may be in a layer of a hierarchical memory system, or it may be a single layer memory system.

At 604, sometime later the line of data and respective ECC bits are accessed from the memory. In this example, the line of data is accessed in response to a request to the upper-level memory. For example, a processor requests a line of data from a cache. If the cache does not contain the data, then the cache control logic accesses a lower-level memory in the hierarchical memory system. In another example, this memory may be an upper-level memory, such as a cache. It may be a tag RAM for a cache. It may be a line buffer, or other layer of memory in a hierarchical memory system.

At 606, a first ECC module coupled to the memory examines the accessed data and ECC bits. At 607, a second ECC module coupled to the memory examines the accessed data and ECC bits.

At 608, the syndrome results provided by the first ECC module and the second ECC module are compared. If they are not the same, then an error has occurred in one or the other ECC modules. In this case, a memory error protocol is initiated at 614 to halt the processor so that it does not execute faulty instruction data.

At 610, if the ECC logic determines there are no errors, then at least a portion the line of data is provided to the requestor at 616.

At 612, if the ECC logic detected an error at 606, if the error is correctable then the defect is corrected at 613, and the corrected data is provided to the requester at 616. In this example, a double bit error can be detected with the Hamming code, but only a single bit error can be corrected. In another example, a more complex ECC code may be used in order to detect and/or correct additional bit errors.

At 614, if a detected error cannot be corrected, then a memory error protocol is invoked. In this example, instruction execution of the processor is halted so that an erroneous instruction is not executed.

In this manner, the ECC logic at each level of a multilevel memory system is tested on every memory access to assure the correct instruction data is being provided to a processor on every instruction fetch cycle.

In this manner, shadow error mitigation and detection blocks are introduced in the instruction path of a CPU in an example system. The placement of error detection logic in the timing critical path is split from error mitigation logic in the non-timing critical path of the instruction pipeline to achieve zero latency.

In described examples, error detection logic is simply optimized to be an 8-bit wide exclusive-or (XOR) logic coupled with instruction completion on the return data path to the CPU, thereby consuming zero latency. Error mitigation logic is also optimized to fit within the same cycle of instruction completion.

In described examples, error detection techniques are described that mitigate timing challenges and enable optimal area-based CPU instruction design with zero latency and no software intervention.

In described examples, safety software is not needed to inject explicit faults. A hardware based active safety diagnostic is performed on every instruction equivalent to a lock step approach.

Other Embodiments

In described examples, various levels of a multilevel memory system are implemented using 64-bit line widths with 8-bit ECC to provide double bit error detection and single bit error correction capability. In another example, wider or narrower line width may be used. For example, a system may be implemented that uses 128-bit lines with 9-bit ECC in all memory levels. In another example, a system may be implemented that uses 256-bit lines with 10-bit ECC.

In described examples, a Hamming code is used to provide double bit error detection and single bit error correction capability. In another example, a different type of ECC code may be used, such as: double-bit error correcting and triple-bit error detecting (DEC-TED) codes, single-nibble error correcting and double-nibble error detecting (SNC-DND) codes, Reed-Solomon error correction codes, etc.

In described examples, an L2 flash RAM and an L1 instruction cache are described. In another example, a multi-level cache may be implemented using the techniques described herein. In another example, both instruction and data caches may be implemented using the techniques described herein. In another example, a different kind of main memory may be implemented using the techniques described herein.

In described examples, the CPU is a Cortex M33 microprocessor optimized for embedded internet of things (IoT) modules. In another example, another type of known or later developed processor may be used.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, etc.

Modifications are possible in the described embodiments, and other embodiments are possible, within the scope of the claims.

What is claimed is:

1. A method of operating a memory system, the method comprising:
   reading a data line and error detection bits for the data line from a first memory;
   decoding the data line and the error detection bits from the first memory to determine if an error is present in the data line;
   storing a copy of the data line and the error detection bits read from the first memory in a second memory;
   reading the copy of the data line and error detection bits from the second memory; and
   decoding the copy of the data line and error detection bits to determine if an error is present in the copy of the data line read from the second memory.

2. The method of claim 1, wherein decoding the data line and error detection bits from the first memory is done by a first decoder and by a second decoder; and further comprising detecting a decoder error by comparing results from the first decoder and the second decoder.

3. The method of claim 2, wherein decoding the copy of the data line and error detection bits from the second memory is done by a third decoder and by a fourth decoder; and further comprising detecting a decoder error by comparing results from the third decoder and the fourth decoder.

4. The method of claim 2, wherein decoding the data line and error detection bits generates a syndrome.

5. The method of claim 1, further comprising:
   receiving the data line and calculating the error detection bits; and
   storing the data line and error detection bits in the first memory.

6. The method of claim 1, wherein if a one-bit error is detected in the data line from the first memory, further comprising correcting the one-bit error using the error detection bits.

7. The method of claim 1, wherein if an error is detected in the copy of the data line, further comprising re-reading the data line and error detection bits from the first memory and replacing the copy of the data line and error detection bits in the second memory with another copy of the data line and error detection bits.

8. The method of claim 1, wherein the first memory is in a lower level of a multilevel memory system and the second memory is in a higher level of the multilevel memory system.

9. The method of claim 8, wherein the first memory is a cache memory and the second memory is a cache memory.

10. The method of claim 1, wherein the first memory is a main memory and the second memory is a cache memory.

11. A system comprising:
- a first memory configured to store multiple lines of multibit (N) data and respective multiple (M) error detection bits;
- an error detection and correction code (ECC) module coupled to the first memory, the ECC module having an output to provide corrected N-bit data and respective M-bit error detection bits for a line of N-bit data accessed from the first memory;
- a second memory configured to store multiple lines of N-bit data and respective multiple M-bit error detection bits, wherein the second memory is coupled to the ECC module output and configured to store a copy of the corrected N-bit data and M-bit error bits; and
- an error detection (ED) module coupled to the second memory, the ED module having an output to indicate an error in a line of N-bit data read from the second memory.

12. The system of claim 11, wherein the first memory is a main memory and the second memory is a cache memory.

13. The system of claim 11, wherein the ECC module is a first ECC module, further comprising:
- a second ECC module coupled to the first memory, wherein the first ECC module as a first error syndrome output and the second ECC module has a second error syndrome output; and
- a diagnostic module with a first input coupled to first error syndrome output and a second input coupled to the second error syndrome output, the diagnostic module having an output to indicate when a first error syndrome value is different from a second error syndrome value.

14. The system of claim 13, wherein the ED module is a first ED module, further comprising:
- a second ED module coupled to the second memory, wherein the first ED module has a third error syndrome output and the second ED module has a fourth error syndrome output; and
- wherein the diagnostic module has a third input coupled to the third error syndrome output and a fourth input coupled to the fourth error syndrome output.

15. The system of claim 11, wherein the first memory has at least two banks configured to each store N-bit data and respective M-bit error detection bits and the ECC module has a respective at least two portions that operate in parallel.

* * * * *